(12) United States Patent
Logue (10) Patent No.: US 9,112,572 B2
(45) Date of Patent: Aug. 18, 2015

(54) 2 CHANNEL SWITCHED LOOP-THRU MICROWAVE SWITCH

(71) Applicant: Mark Scott Logue, Portland, OR (US)

(72) Inventor: Mark Scott Logue, Portland, OR (US)

(*) Notice: Subject to any disclaimer, the term of this patent is extended or adjusted under 35 U.S.C. 154(b) by 324 days.

(21) Appl. No.: 13/858,069

(22) Filed: Apr. 7, 2013

(65) Prior Publication Data
US 2014/0302777 A1   Oct. 9, 2014

(51) Int. Cl.
*H04B 7/15* (2006.01)

(52) U.S. Cl.
CPC .................................. *H04B 7/15* (2013.01)

(58) Field of Classification Search
CPC ........................... H04B 7/15–7/15592
USPC ................................... 455/7, 14–25
See application file for complete search history.

(56) References Cited

U.S. PATENT DOCUMENTS

2008/0012783 A1*  1/2008  Robert et al. ............... 343/876

\* cited by examiner

*Primary Examiner* — Raymond Dean
(74) *Attorney, Agent, or Firm* — Mark Logue (57) ABSTRACT

A five port two channel switch, with switched loop-thru inputs. The switch has DC to 5.5 GHz bandwidth, flat frequency response, excellent transient response, high isolation between channels, and 50 ohm input and output impedance when the channel is either ON or OFF. The input to a unused channel may also be used in another circuit given the loop-thru option of the switch.

16 Claims, 10 Drawing Sheets

2 CHANNEL SWITCHED LOOP-THRU MICROWAVE SWITCH

BACKGROUND OF THE INVENTION

Field of the Invention

The subject invention relates generally to electronic microwave switches using passive components, and more particularly, to a broadband, high frequency, microwave switch employing electromechanical RF relays.

SUMMARY OF THE INVENTION

Accordingly, it is an object of the invention to improve performance of switches that employ high frequency, RF relays. It is another object of the invention to increase broadband bandwidth, provide high isolation between channels, greater than that of a single relay, and provide a 50 ohm input and output impedance with low VSWR, regards of the state of INPUT Channel, that is active or not active, or switched ON or OFF. These and other objects and advantages are achieved with a loop-thru INPUT that can be terminated into 50 ohms at the LOOP-THRU port or used elsewhere in the system.

BRIEF DESCRIPTION OF THE DRAWINGS

The foregoing features of this invention, as well as the invention itself, may be more fully understood from the following description of the drawing in which:

FIG. 3 is a picture of the circuit board of one possible layout of the invention.

FIG. 6 is a plot of the RETURN LOSS with the INPUT port "ON" or "OFF".

FIG. 7 is a plot of S21 of the invention with the INPUT port switched ON.

FIG. 8 is a plot of S11 of the invention with the INPUT port switched ON.

DETAILED DESCRIPTION OF THE PREFERRED EMBODIMENT

Figure 1:
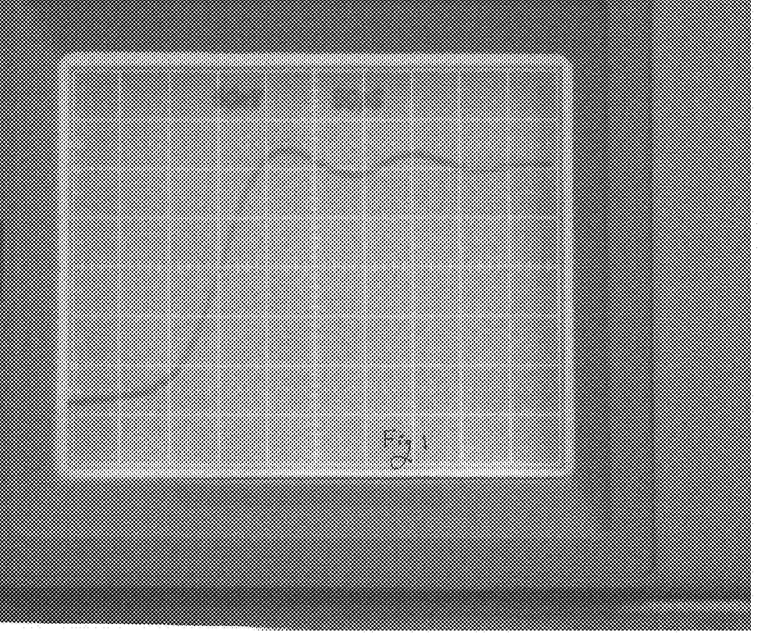
FIG. 1 is a picture of the transient response seen at the OUTPUT port, INPUT1 port "ON".
Figure 2:
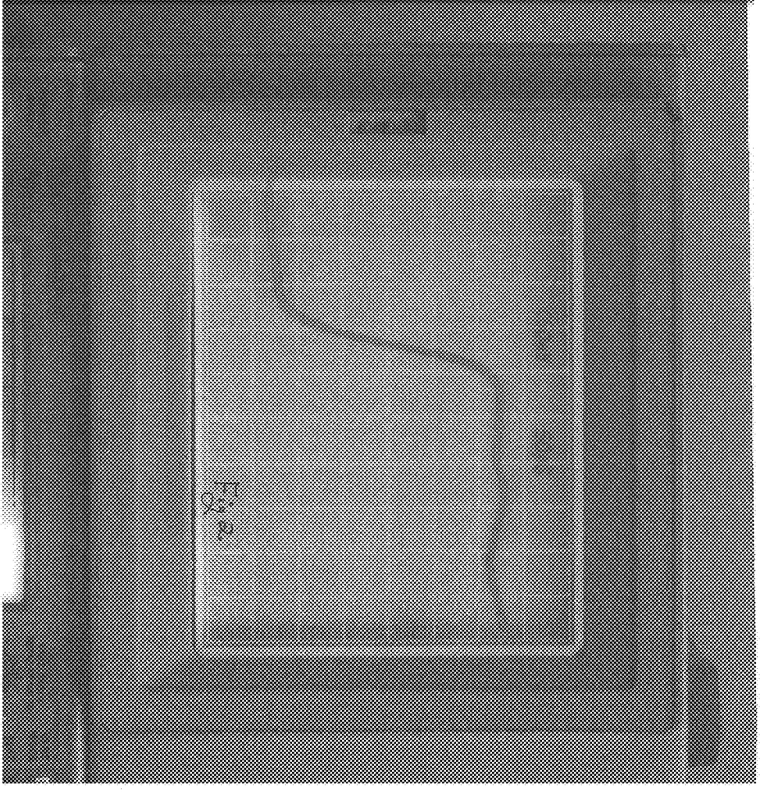
FIG. 2 is a picture of the transient response seen at the LOOP-THRU1 output port, INPUT1 port "OFF".
Figure 4:
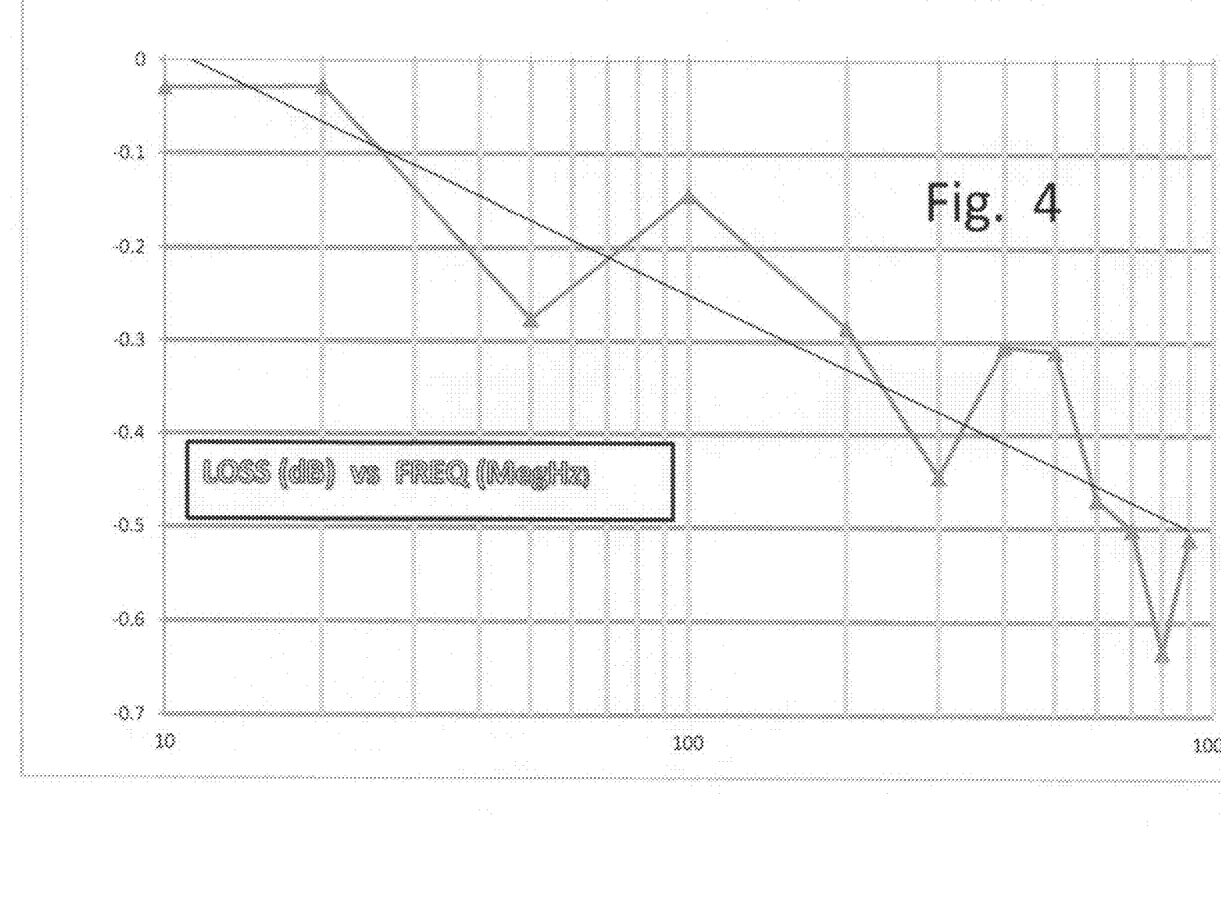
FIG. 4 is a plot of the measured low frequency response of the invention.
Figure 5:
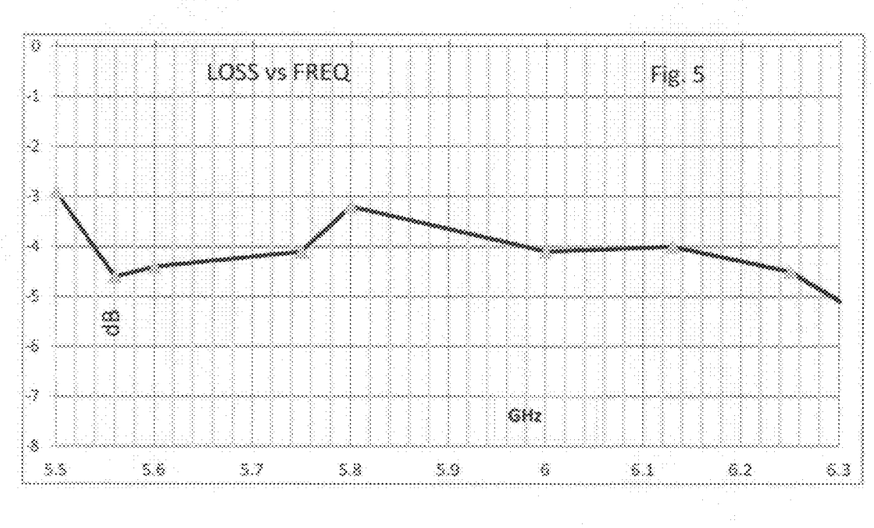
FIG. 5 is a plot of the measured high frequency response of the invention.
Figure 7:
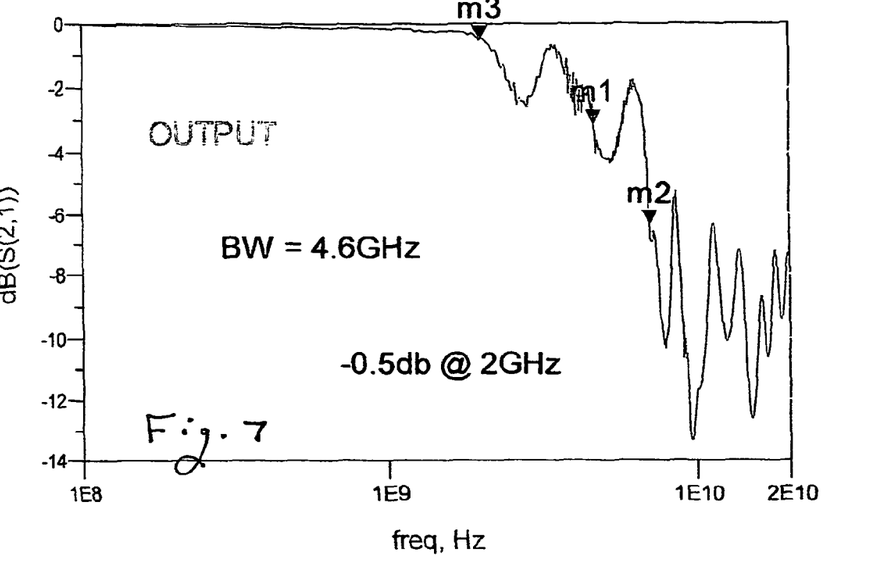
Figure 8:
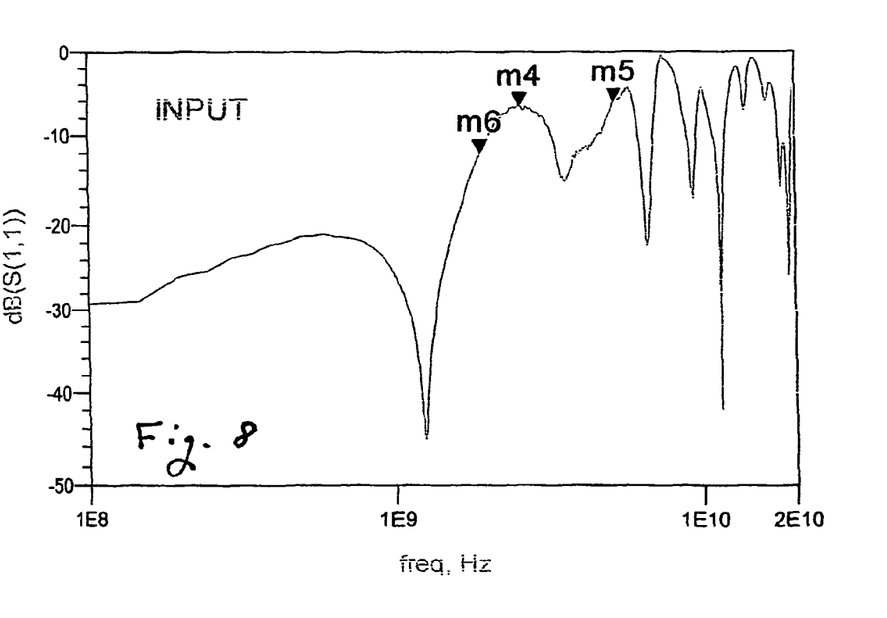
Figure 9:
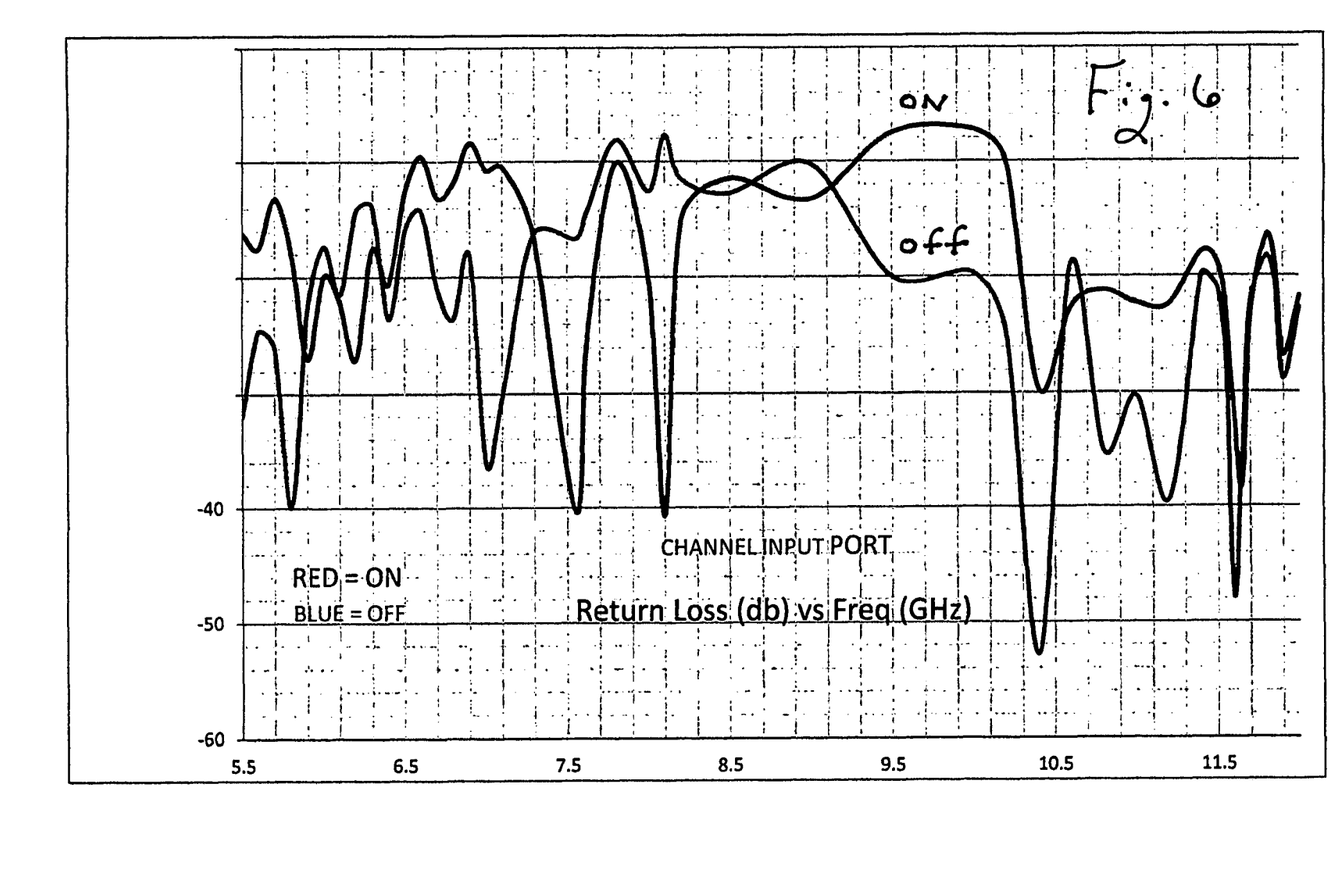
FIG. 9 is a plot of the S21 at the OUTPUT port with the INPUT port switched OFF.
Figure 10:
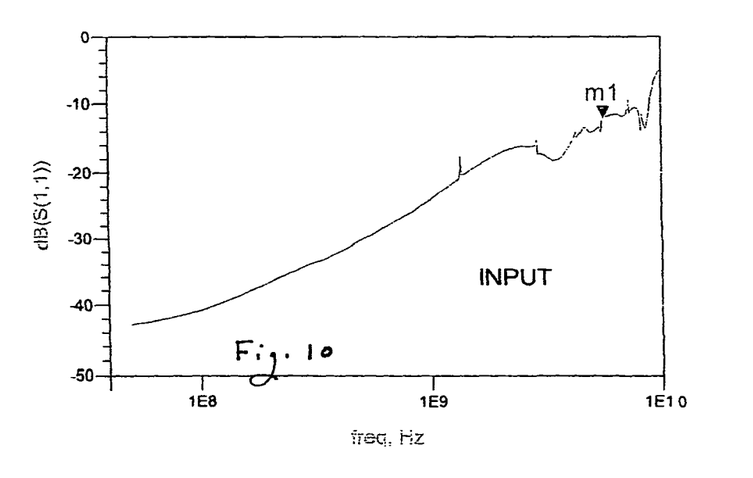
FIG. 10 is a plot of the S11 with the INPUT port switched OFF.
Figure 11:
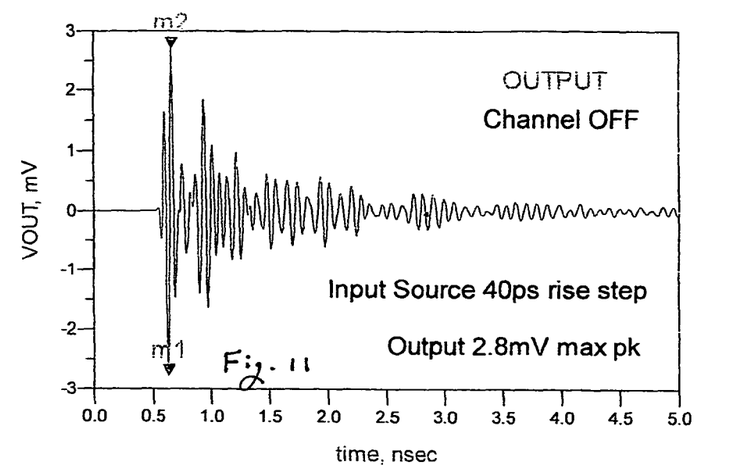
FIG. 11 is a plot of the OUTPUT port with the INPUT port switched OFF.
Figure 12:
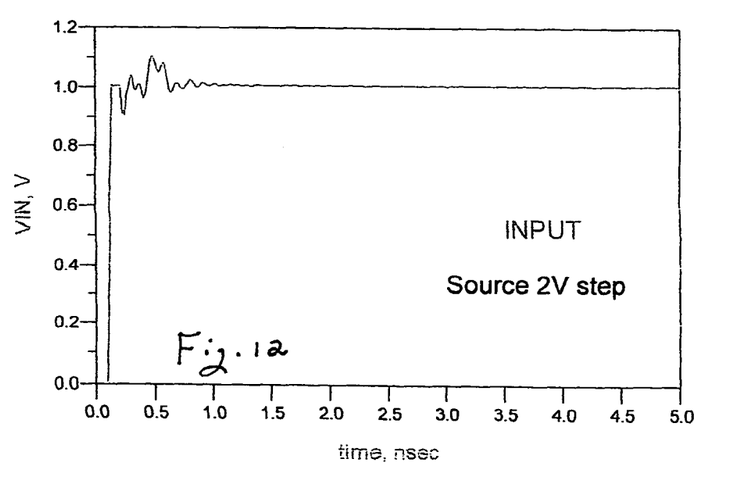
FIG. 12 is a plot of the INPUT port with the INPUT port switched OFF.
Figure 13:
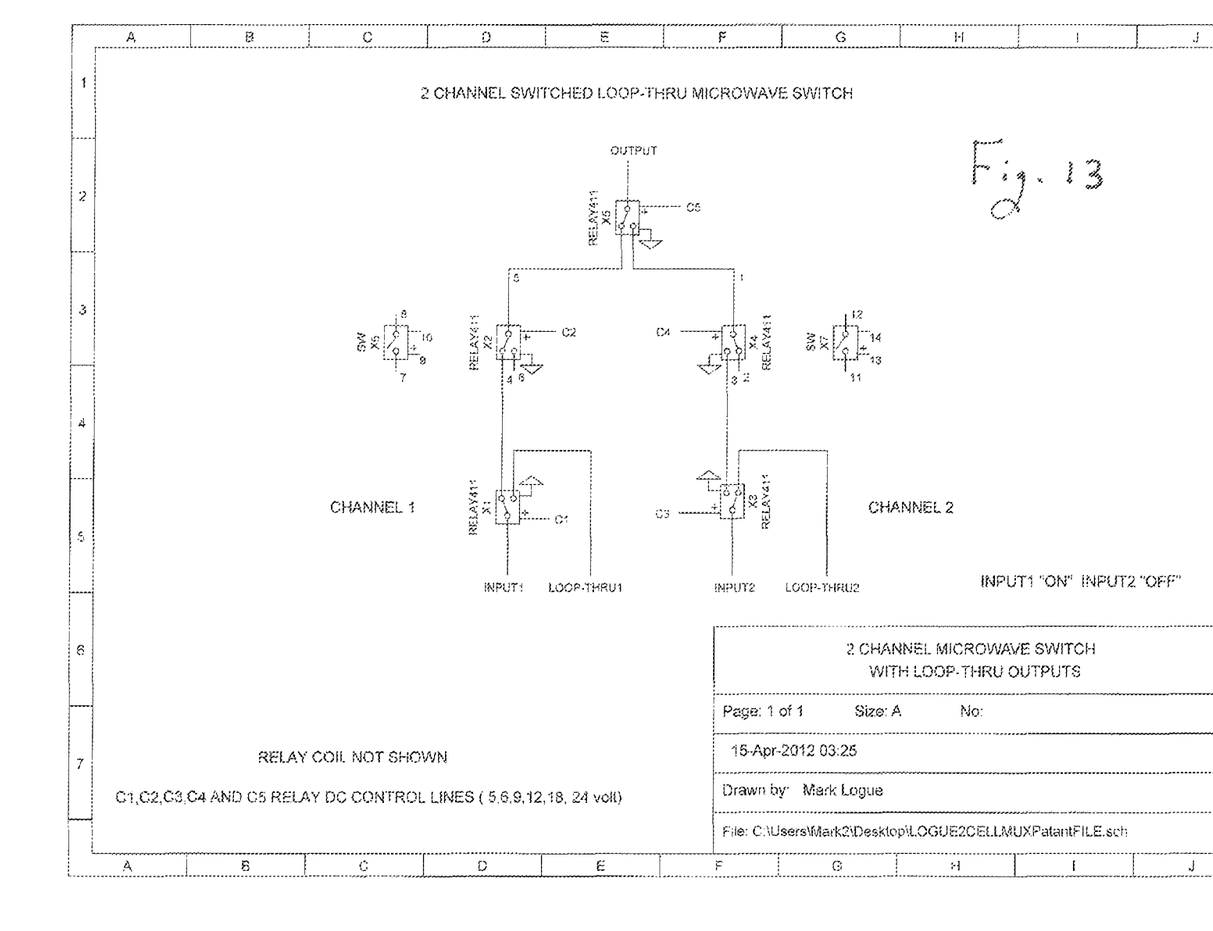
FIG. 13 is a schematic circuit diagram of the preferred embodiment of the invention.

FIG. 13 illustrates a 2 Channel Switch with switched Loop-thru inputs, that is broadband, exhibits excellent transient response, 50 ohm input and output impedance regardless of the state of the input, either active or not active, switched ON or OFF, and a high degree of channel isolation not obtainable utilizing a single relay.

The Loop-thru ports can be terminated into 50 ohms, or the signal available when the input is switched OFF can be used as an input to another switch or as a input or output elsewhere in a system.

Channel 1 consists of three ports; INPUT1, LOOP-THRU1 and OUTPUT. Channel 2 consists of three ports; INPUT2, LOOP-THRU2 and OUTPUT.

Relay X1 is connected to INPUT1, LOOP-THRU1 and relay X2. Relay X2 is connected to relay X1 and relay X5. Relay X5 is connected to OUTPUT, relay X2 and relay X4. Relay X4 is connected to relay X5 and relay X3. Relay X3 is connect to relay X4, INPUT2 and LOOP-THRU2.

C1 is connect to relay X1, C2 is connected to relay X2, C3 is connected to relay X3, C4 is connected to relay X4, and C5 is connected to relay X5. Relay coils are not shown in FIG. A, and are connected to ground and their respective control lines.

The relay control lines shown in the schematic, may be any DC voltage required to change state of the relay employed. The DC control lines are C1, C2, C3, C4 and C5. The control voltages for this particular relay is +5 volts DC. However, 5, 6, 9, 12, 18 and 24 volts DC or any other DC voltage may also be used depending on the design of the relay coil.

The signal path for INPUT1 "ON" and INPUT2 "OFF" is signal at INPUT1 passes through relay X1, relay X2, and OUTPUT relay X5 to the OUTPUT port. The signal path at INPUT2 is through relay X3 to the LOOP-THRU2 output port. Relay X4 is switched "OFF" to prevent signal flow from INPUT2 port, and to increase channel isolation.

The signal path for INPUT1 "OFF" and INPUT2 "ON" is signal at INPUT2 passes through relay X3, relay X4, and the OUTPUT relay X5 to the OUTPUT port. The signal path at INPUT1 is through relay X1 to the LOOP-THRU1 output port. Relay X2 is switched "OFF" to prevent signal flow from the INPUT1 port, and to increase channel isolation.

Relay X2 and relay X4 are three port relays with an unused port, however a two port relay, X6 and X7 might also be used are shown in the schematic diagram of the invention.

The invention does allow BOTH inputs, INPUT1 and INPUT2 to be switched "OFF" unlike traditional 2 CHANNEL SWITCHES. In this case BOTH inputs will be seen at their respective LOOP-THRU output ports, and may be terminated into 50 ohms, or used elsewhere in a system.

I claim:

1. A five port, two channel loop-thru microwave switch, comprising: two input ports, one output port, and two switched loop-thru input ports, further including; five RF/microwave relays, mechanically attached to a circuit board, electrically connected to each other, or to their respective input, or output port.

2. The device of claim 1, wherein the metal frame of the RF/microwave relays are soldered to the backside ground plane of the PCB board, with the leads of the RF/microwave relay coming through the board to the top side of the PCB.

3. The device of claim 1, wherein said RF/microwave relays, and input and output ports are electrically connected with stripline transmission lines.

4. The device of claim 1, wherein said RF/microwave relays, and input and output ports are electrically connected with coplanar transmission lines.

5. The device of claim 1, wherein said RF/microwave relays, or input or output ports are electrically connected with microstrip transmission lines.

6. The device of claim 1, wherein said RF/microwave relays, or input or output ports are electrically connected with coaxial cable.

7. The device of claim 1, wherein said RF/microwave relays, or input or output ports are electrically connected with semi-rigid coaxial cable.

8. The device of claim 1, comprising a fiberglass reinforced epoxy laminate (FR-4) as a substrate material for the PCB containing the RF/microwave relays.

9. The device of claim 1, comprising a glass-microfiber-reinforced polytetrafluoroethylene (PTFE) as a substrate for the PCB containing the five RF/microwave relays.

10. The device of claim 1, comprising a Rogers Corp. High Frequency Laminate, RT/Duroid®, as a substrate for the PCB containing the five RF/microwave relays.

11. The device of claim 1, comprising RT/Duroid® 5870 a product of Rogers Corp., as a substrate for the PCB containing the five RF/microwave relays.

12. The device of claim 1, reinforced with a 62 mil-thick FR-4 PCB attached to the back of the relay board for structural stability.

13. The device of claim 1, comprising a PCB board attached to the back of the main relay board for mechanical support.

14. The device of claim 1, mounted in an open or closed metal cavity.

15. The device of claim 1 consisting of a tapered transmission line filter at said input ports.

16. The device of claim 1 consisting of distributed transmission line filters at input and output ports of each relay.

\* \* \* \* \*